United States Patent [19]

Vatunen

[11] Patent Number: 4,624,688

[45] Date of Patent: Nov. 25, 1986

[54] DEVICE FOR THE PURIFICATION OF GASES

[75] Inventor: Markku T. Vatunen, Kerava, Finland

[73] Assignee: Oy A W Enbom AB, Derava, Finland

[21] Appl. No.: 674,277

[22] Filed: Nov. 23, 1984

[30] Foreign Application Priority Data

Nov. 29, 1983 [FI] Finland ................!.................... 834370

[51] Int. Cl.⁴ ........................ B01D 47/06; B01D 47/12
[52] U.S. Cl. .................................. 55/238; 55/257 C;
55/260; 55/459 R; 261/79 A; 261/22; 261/116
[58] Field of Search ............ 55/238, 237, 236, 257 C,
55/260, 459 R, 257 R, 257 QV, 257 MP; 261/79
A, 116, 22; 209/144, 139 A

[56] References Cited

U.S. PATENT DOCUMENTS

| | | | |
|---|---|---|---|
| 1,958,726 | 3/1934 | Sturtevant | 209/139.2 |
| 2,551,890 | 5/1951 | Love | 55/237 |
| 3,527,026 | 9/1970 | Miura | 55/260 X |
| 3,710,554 | 1/1973 | Brookman | 55/238 X |
| 3,782,080 | 1/1974 | Gallagher | 55/257 MP |
| 4,162,150 | 7/1979 | Carson | 55/452 X |
| 4,308,039 | 12/1981 | Djololian | 55/257 R |
| 4,375,976 | 3/1983 | Potter | 55/238 X |
| 4,386,946 | 6/1983 | Wurz | 55/257 C |
| 4,478,616 | 10/1984 | Järvenpää | 55/257 C |
| 4,514,194 | 4/1985 | Järvenpää | 55/238 X |

FOREIGN PATENT DOCUMENTS

| | | |
|---|---|---|
| 1300904 | 8/1969 | Fed. Rep. of Germany . |
| 30511 | 12/1959 | Finland . |
| 770165 | 7/1978 | Finland . |
| 65172 | 12/1983 | Finland . |
| 874389 | 8/1961 | United Kingdom ................ 209/144 |

Primary Examiner—S. Leon Bashore
Assistant Examiner—Thomas M. Lithgow
Attorney, Agent, or Firm—Wood, Dalton, Phillips, Mason, & Rowe

[57] ABSTRACT

The invention relates to a device which is intended for centrifugal separation on the basis of the specific gravity or by using a medium which increases the specific gravity. The device is in particular suitable for the purification of gases. The device is made up of a cyclone, a pre-scrubbing section and a centrifuge section. The operation of the device is based on rotational motion in the same direction, the separation being carried out by changing the angular velocities of the rotational motion. After moistening of the particles in the cyclone the angular velocity is reduced in the pre-scrubbing section in order to separate the heavy particles, whereafter the angular velocity of the gas being purified, when raised into the centrifuge section, re-increases, and at the same time an additional moistening is carried out, an effective mixing of the liquid and the gas taking place. By means of blowers which resemble a centrifugal pump and a rising spiral in the centrifuge section the material is raised into the centrifuge section, where the slurry is separated and passes through slits in the mantle back into the pre-scrubbing section, or is directed out into a separate pipe system.

10 Claims, 6 Drawing Figures

DEVICE FOR THE PURIFICATION OF GASES

FIELD OF THE INVENTION

The invention relates to all kinds of separation carried out by centrifugal action on the basis of the specific gravity or by using a medium which increases the specific gravity. The object of the invention is a separation result better than that obtained by previous methods, wide applicability for different separation purposes, low operating costs, and a high reliability in operation and thus a low maintenance requirement. The device is primarily intended for the handling of particles traveling along with gas or particles to be separated on the basis of the specific gravities of gas molecules.

The devices known so far as based mainly on systems which separate by cyclonic action or utilize gravity, incidentally touch a drop or molecule, mildly change the pressure, utilize a medium by introducing the medium either by spraying or injecting, or alternatives which increase the speed by means of, for example, a venturi nozzle and thereby cause turbulence (changing the pressure).

SUMMARY OF THE INVENTION

The object of the present invention is to provide a device for the purification of gases, having a separating efficiency better than that of known devices. The invention thus relates to a device for the purification of gases, comprising a cyclone which constitutes the pre-purification section and has a central rising pipe and means for directing the first liquid into the cyclone, and a centrifuge section situated above the cyclone, having an impeller and means for feeding the same or another liquid into it and at its upper end an outlet pipe for the purified gas, and the device according to the invention is characterized in that between the cyclone section and the centrifuge section there is a pre-scrubbing section into which the rising pipe of the cyclone opens and which is connected to the centrifuge section via a central connecting pipe, the first liquid having been arranged to be fed axially, in the flow direction, into the rising pipe of the cyclone, and the same or another liquid having been arranged to be directed axially, in the flow direction, into the connecting pipe between the pre-scrubbing section and the centrifuge section, and that the impeller is located in a casing resembling a centrifugal blower, there being a spirally rising baffle connected to the discharge outlet of this casing.

The invention is presented below in greater detail with reference to an embodiment, depicted diagrammatically in the accompanying drawing, of the device according to the invention.

DESCRIPTION OF THE PREFERRED EMBODIMENT

Figure 1:
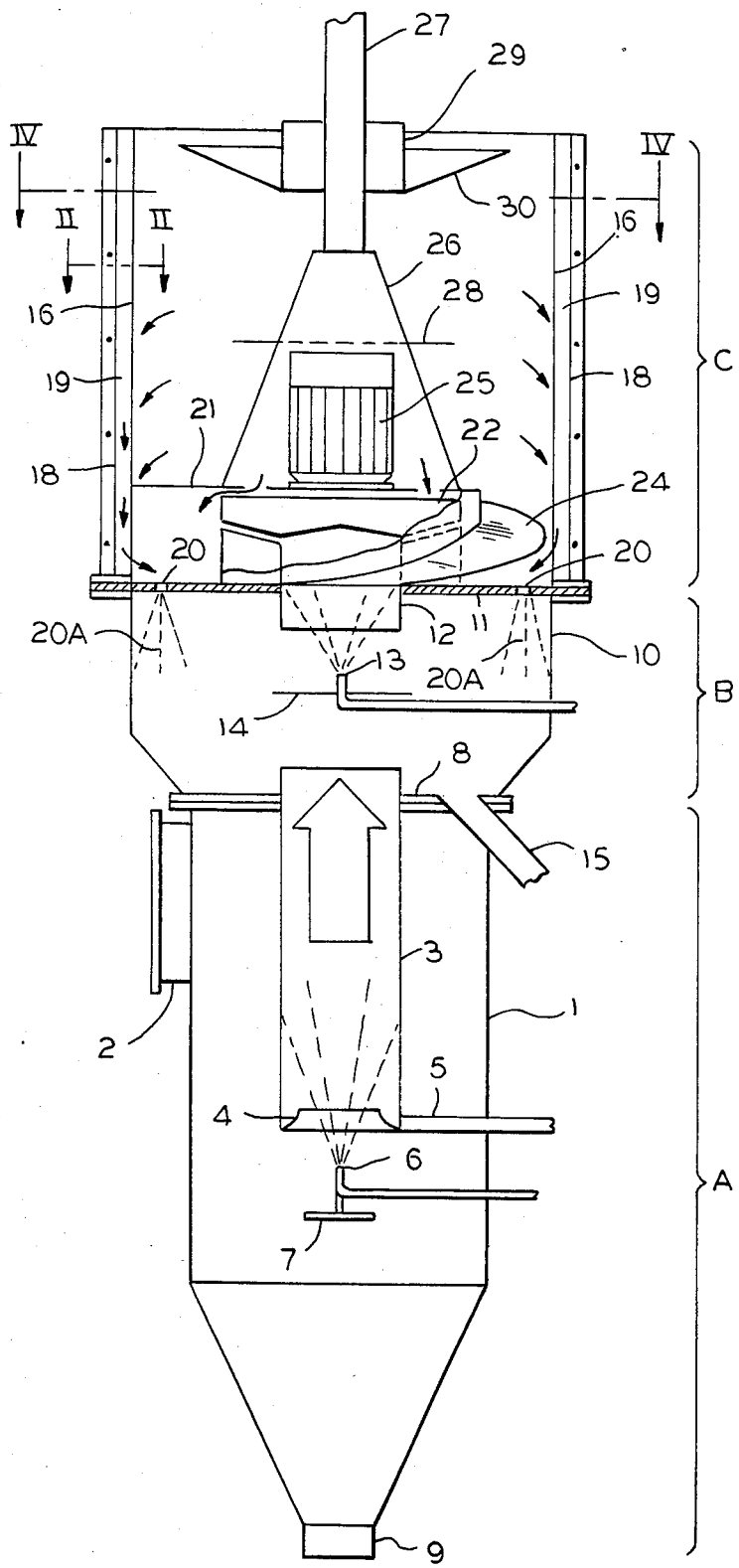
FIG. 1 is a vertical section of the device according to the invention.

The device shown in FIG. 1 is made up of three sections, i.e. the cyclone section A, the pre-scrubbing section B and the centrifuge section C.

The cyclone section comprises a cylindrical vessel 1, with a conical lower part and with a tangential inlet pipe 2 at its upper end for the gas to be purified. The cyclone vessel 1 has a central pipe 3, inside which at the lower end there is a collecting trough 4, to which a tangential outlet pipe 5 is connected. Below the opening of the central pipe 3 there is a spray nozzle 6 for cooling/moistening liquid, from which cooling/moistening liquid is sprayed upwards in the flow direction in the central pipe. Below the nozzle 6 there is preferably a baffle 7 for preventing axial through-flow of gas, which may, however, be omitted. The cyclone vessel 1 is separated by means of a partition 8 from the pre-scrubbing section B situated above it, and the central pipe 3 extends somewhat above this partition. The particles separated in the cyclone vessel leave via the outlet pipe 9 situated at the lower end. Slurry composed of particles and liquid, separated in the central pipe, leaves via the outlet pipe 5.

The pre-scrubbing section B is made up of a cylindrical vessel 10 which converges conically at its lower end and is separated by means of a partition 11 from the centrifuge section C situated above it. In the partition there is a central pipe 12 via which the pre-scrubbing section is connected with the centrifuge section. Below the central pipe 12 there is a liquid spray nozzle 13, from which liquid is sprayed upwards into the central pipe. There is preferably through-flow baffle 14 (which may, however, be omitted), connected to the spray nozzle 13 to prevent direct flow of gas from the rising pipe through the prescrubbing section into the centrifugal section. At the bottom of the vessel 10 there is a tangential outlet pipe 15 for withdrawing the slurry formed by the particles and liquid accumulated in the vessel. The liquid sprayed from the nozzle 13 can be the same liquid as the liquid sprayed into the cyclone section A, or a different one.

Figure 2:
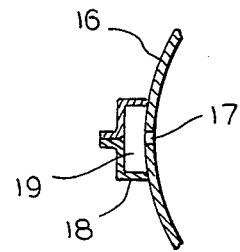
FIG. 2 is a partial sectional view along line II—II of FIG. 1.
Figure 3A:
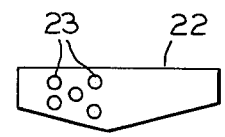
FIGS. 3A and 3B show two different embodiments of a blade of the impeller shown in FIG. 1.
Figure 3B:
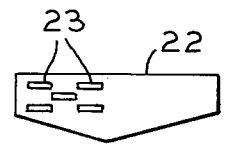
Figure 4:
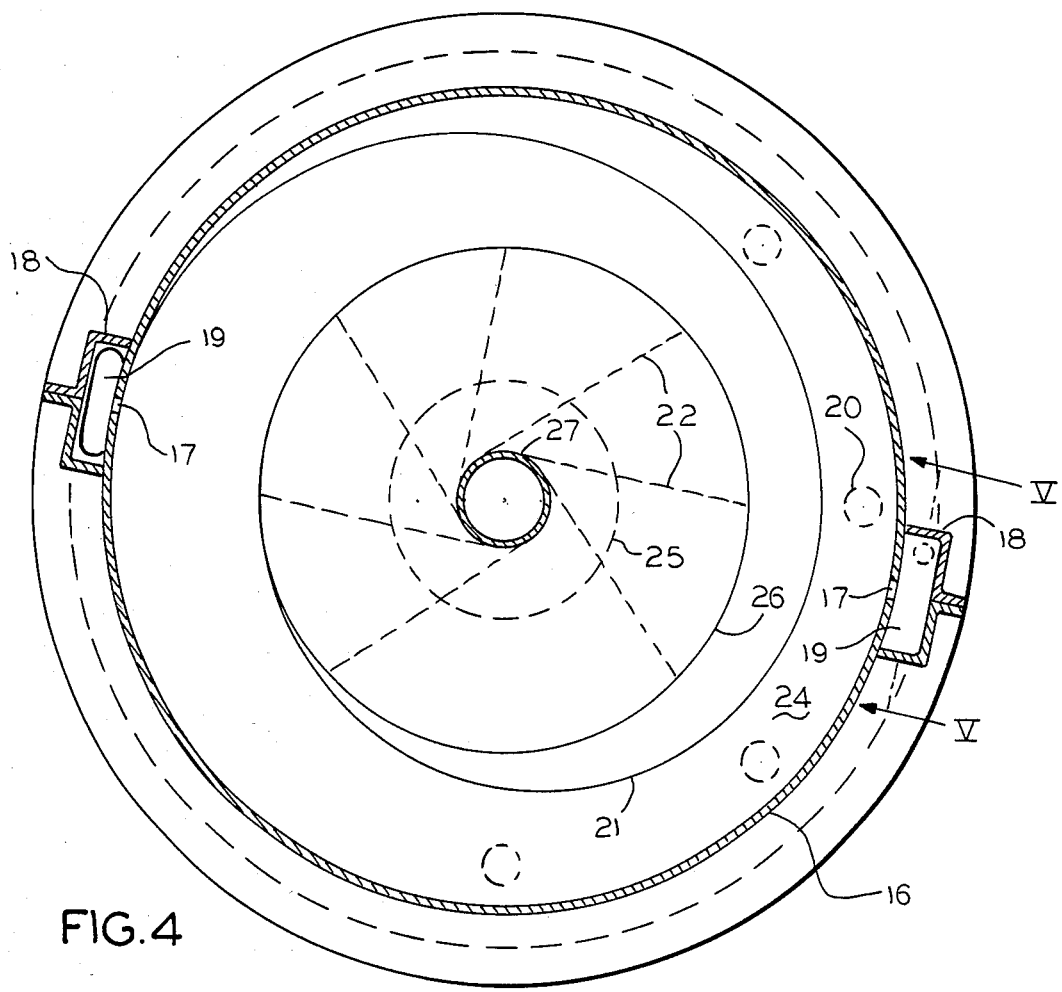
FIG. 4 is a sectional view along line IV—IV of FIG. 1 with baffle 28 omitted.
Figure 5:
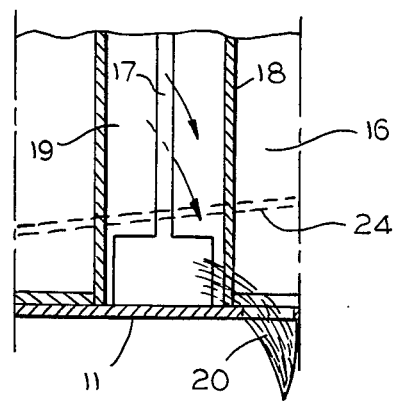
FIG. 5 is a partial sectional view along line V—V of FIG. 4.

After the pre-scrubbing section B the gas to be purified enters the centrifuge section C. This is made up of a cylindrical vessel 16, the mantle of which has at two points, parallel to the diameter, a vertical slit 17, at which there is connected to the mantle an exterior mantle 18 (FIG. 2) in such a way that a vertical conduit 19 adjoining the slit 17 is formed. The width of the slit 17 can be about 10 mm. At the lower end of each conduit 19 there is an opening 20 in the partition 11. Above the central pipe 12 which connects the pre-scrubbing section B to the centrifuge section C there is an impeller 22 fitted to rotate at a high velocity about a vertical shaft in a casing 21 which resembles a centrifugal pump. That part of each blade which, as seen from the center point of the impeller 22, rotates at a lower linear velocity is provided with openings 23, which can be either round holes, as shown in FIG. 3A, or slits, as shown in FIG. 3B. The openings 23 produce a turbulent and varying pressure field on the back surface of the blades (cf. Bernoulli's law; critical pressure ratio, discharge velocity), in which the gas vaporization pressure momentarily and incidentally decreases. By means of the impeller 22 the linear velocity of the gas is raised to the same value or higher than it is at the lower end of the central pipe 3 in the cyclone section A. Starting at the discharge outlet of the casing 21 there is fitted in the vessel 16 a spirally rising baffle 24, which causes the gas flow to rise spirally.

On top of the casing 21 there is fitted the drive motor 25 of the impeller 22, the motor being placed in a conical guard 26, into which air for cooling the motor is directed via the pipe 27. At approximately half the height of the centrifuge vessel 16 there is a drop separation disk 28 mounted on the guard 26, this disk preventing any liquid drops splattered onto the surface of the guard 26 from passing into the gas being blown out, since they come under the influence of rotational motion. At the upper end of the centrifuge vessel 16 there is a gas outlet pipe 29 to which there is connected an inverted cone 30, which prevents the particles heavier than the main flow, in rotational motion, from drifting into the outlet flow.

The operation of the device according to the invention is based on rotational motion in the same direction, wherein the separation of particles from a gas is mainly effected by means of changes in the angular velocities of the rotational motion. In the cyclone section A a rough separation of particles contained in gas is carried out in a manner known per se, on the basis of centrifugal force and changes of the gas direction. The liquid sprayed into the central pipe 3, furthermore, moistens the solid particles, making them heavier and thereby easier to separate. In the central pipe 3 the velocity of the gas flow exceeds 20 m/s. In the pre-scrubbing section the angular velocity of the rotational motion of the gas flow decreases, and the liquid sprayed into the connecting pipe 12 further moistens the particles. Under the effect of the impeller 22 the linear velocity of the liquid/gas flow further increases, being at minimum 65 m/s at the discharge opening of the casing 21. From the discharge opening, the gas flow continues at the same speed for one or several rounds of the circumference of the centrifuge vessel. Under the effect of centrifugal force and because the openings 20 below the spiral baffle 24 in the partition 11 produce under pressure, part of the liquid/gas flow flows via the slits 17 and the conduits 19, and sprays out of the openings 20 as side sprays 20A into the pre-scrubbing vessel. Heavier particles collect on the bottom of the pre-scrubbing vessel and are removed via the outlet pipe 15.

Insufficiently moistened and therefore still lightweight particles are captured into the flow rising from the pre-scrubbing vessel 10 into the centrifuge vessel 16 and are returned to the cycle. Under the effect of this cycle, the effective turbulence produced by the openings 23 in the blades of the impeller 22, and the drop-separating disk 28 and the inverted cone 30, the separation efficiency of the device is very high.

What is claimed is:

1. A device for the purification of gases comprising, in combination:
    a first cylindrical vessel defining a cyclone that provides a pre-purification section, a tangential gas inlet pipe for admitting gas to be purified into said cyclone, an upright central rising pipe on the vertical axis of the cyclone that has an open lower end into which gas flows, and an open upper end, first means for directing a liquid spray upwardly into the open lower end of the rising pipe, a liquid outlet at the lower end of the cyclone, and a first annular partition near the upper end of the rising pipe that defines the top of the cyclone;
    a second cylindrical vessel defining a pre-scrubbing section surmounting said first annular partition, the open upper end of the rising pipe discharging gas into a lower portion of said prescrubbing section, an upright central connecting pipe that has an open lower end toward the top of said prescrubbing section axially aligned with said rising pipe, said connecting pipe having an upper end, a liquid discharge at the bottom of said prescrubbing section, and a second annular partition that surrounds the connecting pipe and defines the top of the pre-scrubbing section;
    and a third cylindrical vessel defining a centrifuge section surmounting said second annular partition, a centrifugal blower casing that has a lateral outlet, a driven impeller in said casing that is immediately adjacent to and axially aligned with the open upper end of the connecting pipe, a spirally rising baffle in said centrifuge section, said baffle having a lower end operatively associated with said blower casing outlet, second means for directing a liquid spray upwardly through the connecting pipe into the blower casing, a purified gas outlet pipe at the upper end of the centrifuge section, and means for discharging liquid from the bottom of the centrifuge section.

2. The device of claim 1 in which the impeller has blades each of which has openings in the part thereof which, as seen from the impeller axis, rotates at a lower linear velocity.

3. The device of claim 2 in which the third cylindrical vessel comprises an upright mantle provided with vertical slits, an external mantle segment defining a conduit with which the centrifuge section communicates through each of said slits, and a hole in the second annular partition which opens into the prescrubbing section operatively associated with each of said conduits and slits so that said slits, conduits and holes comprise said means for discharging liquid from the bottom of the centifuge section.

4. The device of claim 1 in which the third cylindrical vessel comprises an upright mantle provided with vertical slits, an external mantle segment defining a conduit with which the centrifuge section communicates through each of said slits, and a hole in the second annular partition which open into the prescrubbing section operatively associated with each of said conduits and slits so that said slits, conduits and holes comprise said means for discharging liquid from the bottom of the centrifuge section.

5. The device of claim 1 in which the liquid discharge at the bottom of the prescrubbing section is a tangential outlet pipe.

6. The device of claim 1 which includes a baffle mounted in the prescrubbing section below the second means for directing a liquid spray and above the open upper end of the rising pipe to prevent direct flow of gas from the rising pipe through the prescrubbing section into the centrifugal section.

7. The device of claim 1 in which a drive motor for the impeller is in the centrifuge section above the blower casing, a frusto-conical housing encloses said drive motor, an axial air cooling pipe communicates with the interior of said housing, a drop-separating disk surrounds the housing, the purified gas outlet pipe surrounds the air cooling pipe, and an inverted cone surrounds the lower portion of said purified gas outlet pipe.

8. The device of claim 1 in which there is an annular internal collecting trough at the lower end of the rising pipe, and an outlet pipe communicates with said trough and the exterior of the cyclone.

9. The device of claim 8 in which the liquid outlet at the lower end of the cyclone is on the vertical cyclone axis, and a baffle below the first means for directing a liquid spray prevents direct flow of gas along the cyclone axis.

10. The device of claim 1 in which the liquid outlet at the lower end of the cyclone is on the vertical cyclone axis, and a baffle below the first means for directing a liquid spray prevents direct flow of gas along the cyclone axis.

* * * * *